Patented Jan. 10, 1950

2,493,748

UNITED STATES PATENT OFFICE 2,493,748

MEROCYANINE DYES

Leslie G. S. Brooker and Grafton H. Keyes, Rochester, N. Y., assignors to Eastman Kodak Company, Rochester, N. Y., a corporation of New Jersey No Drawing. Application July 16, 1945, Serial No. 605,473

13 Claims. (Cl. 260—240)

This invention relates to merocyanine dyes and more particularly to merocyanine dyes containing a sulfoalkyl and/or a carboxyalkyl group in the keto nucleus (i. e. the nucleus containing the carbonyl group of the auxo-chromophore group).

A number of merocyanine dyes are known, and generally speaking, these can be regarded as neutral substances with a tendency to exhibit basic properties. We have now found a new group of merocyanine dyes which are acidic and which behave, generally speaking, in photographic silver halide emulsions in a different manner from the known merocyanine dyes. Our new acidic merocyanine dyes contain sulfoalkyl and/or carboxyalkyl groups, and usually sensitize photographic silver halide emulsions less strongly (at the same concentration) than do the known merocyanine dyes. In many cases, however, sensitization of a strength comparable to that of the known merocyanine dyes can be obtained by increasing the concentration of the acid merocyanine dye in the photographic silver halide emulsion. All of our new dyes differ further from the known merocyanine dyes in that our dyes leave less stain when sensitized materials containing them are processed.

It is, accordingly, an object of our invention to provide new merocyanine dyes. A further object is to provide a process for preparing such merocyanine dyes. A still further object is to provide photographic emulsions containing such merocyanine dyes. Other objects will become apparent hereinafter.

Our new merocyanine dyes can be represented by the following general formula:

I.

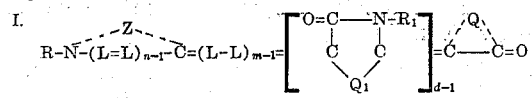

wherein R and $R_1$ each represents an alcohol radical (i. e. an alkyl group substituted or unsubstituted) e. g. methyl, ethyl, n-butyl, isobutyl, allyl, $\beta$-ethoxyethyl, $\beta$-hydroxyethyl, $\beta$-acetoxyethyl, carbethoxymethyl, $\beta$-phenylethyl or benzyl, or R and $R_1$ each represents an aryl group, e. g. phenyl, L represents a methine group substituted or unsubstituted, $n$ represents a positive integer of from 1 to 2, $m$ represents a positive integer of from 1 to 3, $d$ represents a positive integer of from 1 to 3, $Q_1$ represents an oxygen atom, a sulfur atom, or a group of the formula

wherein $R_3$ represents an alcohol radical (i. e. an alkyl group substituted or unsubstituted), or an aryl group, Q represents the non-metallic atoms necessary to complete a heterocyclic nucleus containing 5 atoms in the heterocyclic ring, e. g. a rhodanine nucleus, a 2-thio-2,4(3,5)-oxazolidione nucleus, a 2-thiohydantoin nucleus, a 5-pyrazolone nucleus, etc., said heterocyclic nucleus containing at least one group selected from the group consisting of sulfo (—$SO_3H$) alkyl and carboxy (—COOH) alkyl groups and Z represents the non-metallic atoms necessary to complete a heterocyclic nucleus containing from 5 to 6 carbon atoms in the heterocyclic ring, e. g. a nucleus of the benzothiazole series, a nucleus of the benzoxazole series, a nucleus of the benzoselenazole series, a nucleus of the $\alpha$-naphthothiazole series, a nucleus of the $\beta$-naphthothiazole series, a nucleus of the $\alpha$-naphthoxazole series, a nucleus of the $\beta$-naphthoxazole series, a nucleus of the $\alpha$-naphthoselenazole series, a nucleus of the $\beta$-naphthoselenazole series, a nucleus of the thiazoline series, a nucleus of the simple thiazole series (e. g. 4-methylthiazole, 4-phenylthiazole, 4-(2-thienyl)-thiazole, etc.), a nucleus of the simple selenazole series (e. g. 4-methylselenazole, 4-phenylselenazole, etc.) a nucleus of the simple oxazole series (e. g. 4-methyloxazole, 4-phenylthiazole, etc.), a nucleus of the quinoline series, a nucleus of the pyridine series, a nucleus of the 3,3-dialkylindolenine, etc.

In accordance with our invention, we prepare merocyanine dyes containing a sulfoalkyl and/or a carboxyalkyl group by condensing a cyclammonium quaternary salt containing in the $\alpha$- or $\gamma$-position (i. e. one of the so-called reactive positions) a thioether group, e. g. an alkylthio, an aralkylthio or an arylthio group, or a halogen atom, e. g. a chlorine, a bromine or an iodine atom, with a heterocyclic compound containing 5 atoms in the heterocyclic ring and containing a ketomethylene (—CO—$CH_2$—) group in the heterocyclic ring, said ketomethylene compound containing a sulfoalkyl and/or a carboxyalkyl group. This condensation gives "simple" merocyanine dyes, containing a sulfoalkyl and/or a carboxyalkyl group in the keto nucleus, i. e. merocyanine dyes of the following general formula:

II.

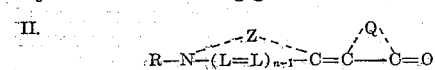

where R, L, $n$, Q and Z have the values given above.

The condensations are advantageously carried out in the presence of a basic condensing agent, e. g. a tertiary amine, such as pyridine, a trialkylamine or a N-alkylpiperidine. Alkali metal carbonates or alkali metal alcoholates can also be employed. A reaction medium can be employed, e. g. a lower molecular weight alcohol, such as ethyl, n-propyl, isopropyl, n-butyl or isobutyl alcohol.

Simple merocyanine dyes containing a 4-quinoline nucleus and a keto nucleus containing a sulfoalkyl and/or a carboxyalkyl group can also be prepared by condensing a quinoline quaternary salt containing no substituent in the 4-position, with a heterocyclic compound containing 5 atoms in the heterocyclic ring and containing in the heterocyclic ring a ketomethylene group and containing a sulfoalkyl and/or carboxyalkyl group, in the presence of an alcoholic solution of an alkali metal hydroxide, e. g. potassium hydroxide. Alcohols of the formula $C_nH_{2n+1}OH$ wherein $n$ represents a positive integer of from 1 to 4 are advantageously employed.

In accordance with our invention, we prepare merocyanine dyes of the carbo series (i. e. merocarbocyanine dyes) containing a sulfoalkyl or carboxyalkyl group by condensing a cyclammonium quaternary salt containing in the $\alpha$- or $\gamma$-position (i. e. one of the so-called reactive positions) a $\beta$-arylaminovinyl group, with a heterocyclic compound containing 5 atoms in the heterocylic ring and containing a ketomethylene group in the heterocyclic ring, said ketomethylene compound containing a sulfoalkyl and/or a carboxyalkyl group. The $\beta$-arylaminovinyl group is advantageously an acylated $\beta$-arylaminovinyl group, e. g. a $\beta$-acetanilidovinyl group. This condensation gives merocarbocyanine dyes containing a sulfoalkyl and/or a carboxyalkyl group in the keto nucleus, i. e. merocyanine dyes of the following general formula.

III.

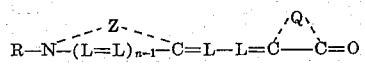

wherein R, L, $n$, Q and Z have the values recited above.

The condensations are advantageously carried out in the presence of a basic condensing agent, e. g. a tertiary amine, such as a trimethylamine, triethylamine, dimethylaniline, or a N-alkylpiperidine. A reaction medium is advantageously employed, e. g. pyridine or a lower molecular weight alcohol, such as ethyl, n-propyl, isopropyl, n-butyl or isobutyl alcohol. An alkali metal carboxylate in a carboxylic anhydride can also be used as basic condensing agent, e. g. sodium acetate in acetic anhydride.

The above merocarbocyanine dyes can also be prepared by condensing a cyclammonium quaternary salt containing in the $\alpha$- or $\gamma$-position a —$CH_2R_4$ group wherein $R_4$ represents hydrogen, an alkyl group, an alkoxyl or an aryloxyl group, with an orthoester of a carboxylic acid, e. g. ethyl orthoformate, ethyl orthoacetate, ethyl orthopropionate, etc., and a heterocyclic compound containing 5 atoms in the heterocyclic ring and containing a ketomethylene group, said ketomethylene compound containing a sulfoalkyl and/or a carboxyalkyl group. The condensations are advantageously carried out in the presence of a basic condensing agent, such as those recited above. A reaction medium of a lower molecular weight alcohol is advantageously employed.

The above merocarbocyanine dyes containing a substituent on the dimethine chain adjacent to the keto heterocyclic nucleus can also be prepared by condensing a cyclammonium quaternary salt containing in the $\alpha$- or $\gamma$-position a $\beta$-alkylmercaptovinyl group, with a heterocyclic compound containing 5 atoms in the heterocyclic ring and containing a ketomethylene group in the heterocylic ring, said ketomethylene compound containing a sulfoalkyl and/or a carboxyalkyl group.

The condensations are advantageously carried out in the presence of a basic condensing agent, e. g. a trialkylamine, a N-alkylpiperidine or an alkali metal carbonate. A reaction medium of a lower molecular weight alcohol is advantageously employed.

In accordance with our invention, we prepare merocyanine dyes of the dicarbo series (i. e. merodicarbocyanine dyes) containing a sulfoalkyl or carboxyalkyl group by condensing a cyclammonium quaternary salt containing in the $\alpha$- or $\gamma$-position, a 4-arylamino-1,3-butadienyl group, with a heterocyclic compound containing 5 atoms in the heterocyclic ring and containing a ketomethylene group in the heterocyclic ring, said ketomethylene compound containing a sulfoalkyl and/or a carboxyalkyl group. The 4-arylamino-1,3-butadienyl group is advantageously an acylated 4-arylamino-1,3-butadienyl group, e. g. a 4-acetanilido-1,3-butadienyl group. This condensation gives merodicarbocyanine dyes containing a sulfoalkyl and/or a carboxyalkyl group in the keto nucleus, i. e. merocyanine dyes of the following general formula:

IV.

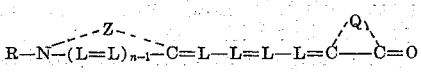

wherein R, L, $n$, Q and Z have the values recited above.

The condensations are advantageously carried out in the presence of a basic condensing agent, e. g. a tertiary amine, such as trimethylamine, triethylamine, dimethylaniline, or a N-alkylpiperidine. A reaction medium is advantageously employed, such as ethyl, n-propyl, isopropyl, n-butyl or isobutyl alcohol. An alkali metal carboxylate in a carboxylic anhydride can also be used as basic condensing agent, e. g. sodium acetate in acetic anhydride.

In accordance with our invention, we prepare merocyanine dyes containing more than two heterocyclic nuclei by treating a merocyanine dye of the following general formula:

V.

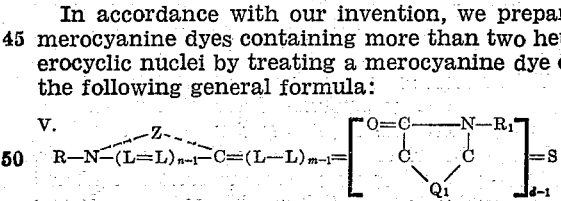

wherein R, $R_1$, $n$, Z, $m$ and $Q_1$ have the values recited above, and $d$ represents a positive integer of from 2 to 3 with an alkyl salt to obtain a quaternary alkylmercapto compound of the following general formula:

VI.

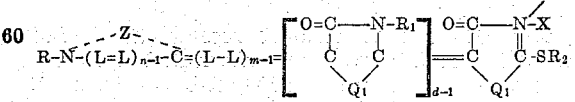

wherein R, L, $n$, $m$, $R_1$, $Q_1$ and Z have the values recited above, $R_2$ represents an alcohol radical (i. e. an alkyl group substituted or unsubstituted) $d$ represents a positive integer of from 1 to 2, and X represents an anion. We then condense the quaternary compound with a heterocyclic compound containing 5 atoms in the heterocyclic ring and containing a ketomethylene group in the heterocyclic ring, said ketomethylene group containing a sulfoalkyl and/or a carboxyalkyl group. This condensation gives complex merocyanine dyes containing three or four heterocyclic nuclei, i. e. merocyanine dyes of the following general formula:

VII.
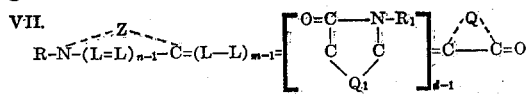

wherein R, L, n, m, Z, Q₁, R₁ and Q have the values set forth above and d represents a positive integer of from 2 to 3.

The condensations of the quaternary alkylmercapto compounds with the ketomethylene compounds are advantageously carried out in the presence of a basic condensing agent, e. g. a trialkylamine or a N-alkylpiperidine or an alkali metal carbonate, using a lower molecular weight alcohol as reaction medium.

The following examples will serve to illustrate further our new dyes and the manner of obtaining the same.

*Example 1.—3-carboxymethyl-5-(3-ethyl-2(3)-benzothiazolylidene)rhodanine*

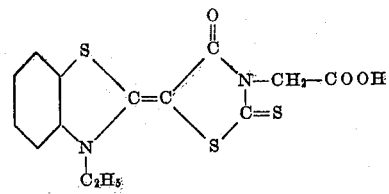

3.5 g. (1 mol.) of 2-ethylmercaptobenzothiazole ethiodide, 1.9 g. (1 mol.) of 3-carboxymethylrhodanine, 15 cc. of methyl alcohol and 2.02 g. (2 mol.) of triethylamine were mixed together and allowed to stand at room temperature for 40 hours. After acidification with acetic acid, the dye separated and was collected on a filter, washed and dried. It was purified by dissolving in a mixture of ethyl alcohol and triethylamine, and reprecipitated by acidifying with acetic acid. It was obtained as yellow crystals.

Using 2-ethylmercaptobenzoselenazole ethiodide, 3-carboxymethyl-5-(3-ethyl-2(3)-benzoselenazolylidene)rhodanine can be similarly prepared.

*Example 2.—5-(3-ethyl-2(3)-benzothiazolylidene)-3-β-sulfoethylrhodanine*

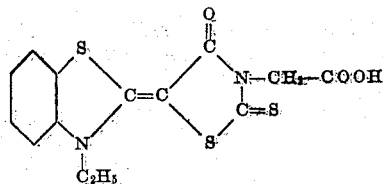

1.75 g. (1 mol.) of 2-ethylmercaptobenzothiazole ethiodide, 1.2 g. (1 mol.) of 3-β-sulfoethylrhodanine, 20 cc. of 50 per cent aqueous ethyl alcohol and 1 g. (2 mol.) of triethylamine were heated under reflux for 15 minutes. The dye separated on chilling and was collected on a filter, washed with water, methyl alcohol and dried. After recrystallization from 50 per cent aqueous methyl alcohol, it was obtained as yellow crystals.

*Example 3.—5-(1-n-butyl-4(1)-quinolylidene)-3-carboxymethylrhodanine*

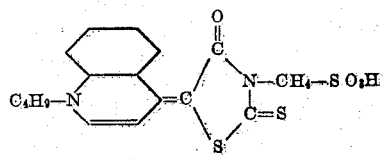

6.2 g. (2 mol.) of quinoline n-butiodide, 1.9 g. (1 mol.) of 3-carboxymethylrhodanine, 2 g. (3 mol.) of potassium hydroxide and 50 cc. of absolute ethyl alcohol were mixed together and refluxed for 30 minutes. After chilling and acidifying the mixture with hydrochloric acid, the dye separated. It was purified by dissolving in a mixture of triethylamine and ethyl alcohol and reprecipitated by making the solution acid with acetic acid. It was obtained as deep red crystals of M. P. 262° to 264° C. dec.

*Example 4.—3-(1,3-dicarboxy)-n-propyl-5-[(3-ethyl - 2(3) - benzothiazolylidene)ethylidene] rhodanine*

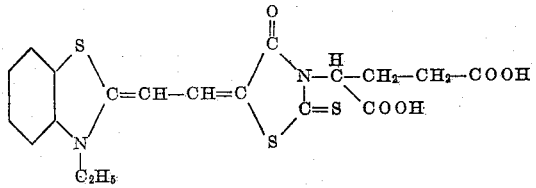

2.25 g. (1 mol.) of 2-β-acetanilidovinylbenzothiazole ethiodide, 1.3 g. (1 mol.) of 3-(1,3-dicarboxy-n-propyl)rhodanine, 35 cc. of absolute ethyl alcohol and 1.5 g. (3 mol.) of triethylamine were heated together under reflux for 30 minutes. After chilling and making the reaction acidic with hydrochloric acid, the dye separated. It was purified by dissolving in a mixture of ethyl alcohol and triethylamine, and reprecipitating by acidification with acetic acid. It was obtained as green crystals M. P. 213° to 215° C.

*Example 5.—3-carboxymethyl-5-[(1-ethyl-2(1)-quinolylidene)-ethylidene]rhodanine*

2.2 g. (1 mol.) of 2-β-acetanilidovinylquinoline ethiodide, .95 g. (1 mol.) of 3-carboxymethylrhodanine, 35 cc. of absolute ethyl alcohol and 1 g. (2 mol.) of triethylamine were mixed together and refluxed for 20 minutes. The dye separated on chilling and addition of 3 cc. of glacial acetic acid. The crude dye was purified by dissolving in a mixture of ethyl alcohol and triethylamine and reprecipitating by the addition of acetic acid. It was obtained as purple crystals M. P. 286° to 288° C. dec.

*Example 6. — 3-carboxymethyl-5-[(3-methyl-2-(3) - thiazolinylidene) -ethylidene]-2-thio-2,4-(3,5)-oxazoledione*

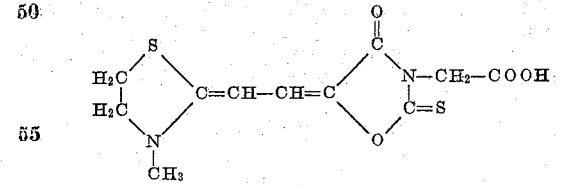

3.3 g. (1 mol.) of 2-β-anilinovinylthiazoline methiodide, 1.75 g. (1 mol.) of 3-carboxymethyl-2-thio-2,4(3,5)-oxazoledione, 25 cc. of absolute ethyl alcohol and 2.02 g. (1 mol.) of triethylamine were mixed together and refluxed for 30 minutes. The dye separated from the reaction mixture on chilling and acidifying with hydrochloric acid. It was purified by dissolving in a mixture of ethyl alcohol and triethylamine, and reprecipitating by the addition of acetic acid. It was obtained as orange needles M. P. 256° to 257° C. dec.

*Example 7.—3-β-carboxyethyl-5-[(3-ethyl-2(3)-benzoxazolylidene) -ethylidene]rhodanine*

2.2 g. (1 mol.) of 2-β-acetanilidovinylbenzoxazole ethiodide, 1 g. (1 mol.) of 3-β-carboxyethyl rhodanine, 35 cc. of absolute ethyl alcohol and 1 g. (1 mol.) of triethylamine were refluxed for 30 minutes. The cooled reaction mixture was acidified with hydrochloric acid and then chilled. The dye separated and was collected on a filter, washed and dried. It was purified by dissolving in a mixture of ethyl alcohol and triethylamine and filtering. The dye separated on adding hydrochloric acid to make the solution acid, and then chilling. It was obtained as reddish-orange crystals M. P. 268° to 270° C.

*Example 8.—3-α-carboxyethyl-5-[(3-ethyl-2(3)-benzothiazolylidene)-ethylidene]rhodanine*

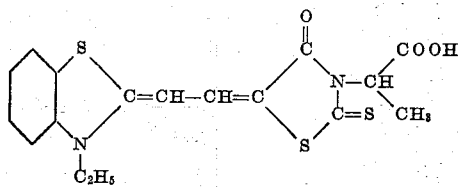

2.2 g. (1 mol.) of 2-β-acetanilidovinylbenzothiazole ethiodide, 1 g. (1 mol.) of 3-α-carboxyethylrhodanine, 35 cc. of absolute ethyl alcohol and 1 g. (2 mol.) of triethylamine were mixed together and refluxed for 30 minutes. The reaction mixture was then acidified with acetic acid and chilled. The crude washed dye was purified by recrystallization from ethyl alcohol plus triethylamine. The dye separated on making the solution acid with acetic acid and chilling. It was obtained as bluish-red crystals M. P. 286° to 288° C. dec.

*Example 9.—3-carboxymethyl-5-[(3-ethyl-2(3)-benzothiazolylidene)-ethylidene]rhodanine*

2.25 g. (1 mol.) of 2-β-acetanilidovinylbenzothiazole ethiodide, 1.1 g. (1 mol.) of 3-carboxymethylrhodanine, 25 cc. of absolute ethyl alcohol and 1.01 g. (1 mol.) of triethylamine were mixed together and refluxed for 30 minutes. After acidifying the solution with acetic acid, dye separated on chilling. The crude washed dye was purified by dissolving in hot pyridine and precipitating by the addition of methyl alcohol plus acetic acid. Dye obtained had a M. P. of 298° C. dec.

*Example 10.—3-carboxymethyl-5-[(3-ethyl-2(3)-benzoxazolylidene) ethylidene]rhodanine*

2.2 g. (1 mol.) of 2-β-acetanilidovinylbenzoxazole ethiodide, 1.1 g. (1 mol.) of 3-carboxymethylrhodanine, 25 cc. of absolute ethyl alcohol and 1.01 g. (1 mol.) of triethylamine were mixed together and refluxed for 30 minutes. After chilling, the mixture was acidified by addition of 4 cc. of glacial acetic acid and the dye separated. The crude washed dye was purified by dissolving in ethyl alcohol with triethylamine added, filtering hot and then making acid with glacial acetic acid and chilling. It was obtained as scarlet plates M. P. 307° C. dec.

*Example 11.—5-[(3-ethyl - 2(3) - benzoxazolylidene) ethylidene]-3-β-sulfoethyl rhodanine*

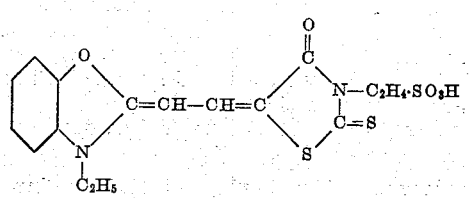

1.2 g. (1 mol.) of 3-β-sulfoethylrhodanine, 2.15 g. (1 mol.) of 2-β-acetanilidovinylbenzoxazole ethiodide, 30 cc. of absolute ethyl alcohol and 2 g. (2 mol.) of triethylamine were heated under reflux for 15 minutes. The dye separated on chilling. It was then collected on a filter, washed with water, methyl alcohol and dried. The crude dye was purified by two recrystallizations from methyl alcohol.

*Example 12.—5-[(3-ethyl - 2(3)-benzoxazolylidene) ethylidene] - 3 - sulfomethyl - 2 - thio-2,4(3,5)-oxazoledione*

2.15 g. (1 mol.) of 2-β-acetanilidovinylbenzoxazole ethiodide, 1.05 g. (1 mol.) of 3-sulfomethyl-2-thio-2,4(3,5)-oxazoledione, 25 cc. of absolute ethyl alcohol and 1 g. (2 mol.) triethylamine were refluxed together for 15 minutes. The dye which separated on chilling was washed with water, methyl alcohol and dried. After two recrystallizations from 50 per cent aqueous methyl alcohol, it was obtained as yellow crystals.

*Example 13.—5 - [3 - methyl - 2(3)-thiazolinylidene) isopropylidene]-3-β-sulfoethylrhodanine*

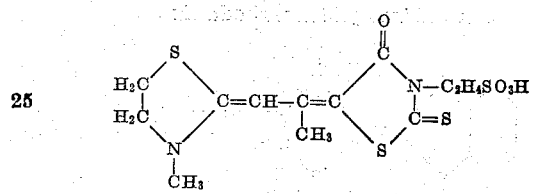

4.9 g. (1 mol.) of 2-methylthiazoline methiodide, 4.8 g. (1 mol.) of 3-β-sulfoethylrhodanine, 50 cc. of absolute ethyl alcohol, 6.5 g. (1 mol.+100% excess) ethyl orthoacetate and 2 g. (1 mol.) of triethylamine were heated under reflux for six hours. The dye separated on chilling. After washing with water and drying it was purified by recrystallization from water and obtained as orange-yellow crystals.

*Example 13a.—5-[(3-ethyl - 2(3) - benzoxazolylidene) ethylidene] - 3 - β - sulfoethyl - 2 - thio-2,4(3,5)-oxazoledione*

This dye was prepared as illustrated in Example 12 by using 1.1 g. (1 mol.) of 3-β-sulfoethyl-2-thio-2,4(3,5)-oxazoledione in place of the 1.05 g. of 3-sulfomethyl-2-thio-2,4(3,5)-oxazoledione. The yellow crystals had a melting point above 300° C.

*Example 14.—5-[(3-ethyl-2(3)-benzothiazolylidene) isopropylidene] - 3 - β-sulfoethyl-2-thio-2,4(3,5)-oxazoledione*

2.1 g. (1 mol.) of 2-(2-methylmercapto-propenyl)-benzothiazole etho - p - toluenesulfonate, 1.1 g. (1 mol.) of 3-β-sulfoethyl-2-thio-2,4(3,5)-oxazoledione, 15 cc. of ethyl alcohol, 10 cc. of water and 1 g. (2 mol.) of triethylamine were refluxed together for 20 minutes. The dye which separated on chilling was filtered, washed with methyl alcohol and dried. It was purified by two recrystallizations from 50 per cent aqueous methyl alcohol and had an M. P. of 286° to 288° C. dec.

*Example 15.—5 - [(3-ethyl-2(3)-benzothiazolylidene) isopropylidene]-3 - β - sulfoethylrhodanine*

1.2 g. (1 mol.) of 3-ethyl-2-thioacetylmethylene-benzothiazoline and 1 g. (1 mol.) of methyl-p-toluenesulfonate were heated together on a steam bath for 30 minutes. The fused mass of mercapto intermediate thus formed was dissolved in 20 cc. of absolute ethyl alcohol. To this solution was added 1.2 g. (1 mol.) of 3-β-sulfoethylrhodanine and 1 g. (2 mol.) of triethylamine and the whole refluxed for 15 minutes. The dye separated on chilling. It was collected on a filter, washed with water, methyl alcohol and dried. It was purified by two recrystallizations from methyl alcohol.

*Example 15a.—1-carboxymethyl - 5 - [(3-ethyl-2(3) - benzoxazolylidene) - ethylidene] - 3 - phenyl-2-thiohydantoin*

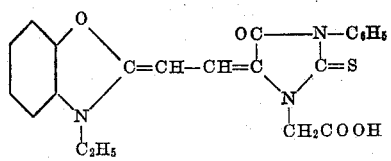

1.7 g. (1 mol.) of 2-β-acetanilidovinylbenzoxazole ethiodide, 1.0 g. (1 mol.) of 1-carboxymethyl-3-phenyl-2-thiohydantoin and 10 cc. of pyridine were mixed together and heated under reflux for 30 minutes. The cooled reaction mixture was made acidic on addition of dilute acetic acid. Dye separated as a sticky mass. It solidified on stirring with ether. The dye was then purified by extraction with several successive portions of ether.

*Example 15b.—3-carboxymethyl-5-[(3-methyl-2(3)-thiazolinylidene) isopropylidene]-rhodanine*

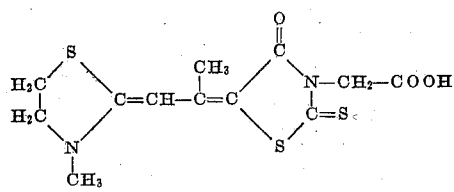

4.04 g. (2 mol.) of triethylamine were added to a mixture of 4.85 g. (1 mol.) of 2-methylthiazoline methiodide, 3.8 g. (1 mol.) of 3-carboxymethyl rhodanine, 6.5 g. (2 mol.) of ethyl orthoacetate and 40 cc. of ethyl alcohol. The resulting mixture was refluxed for 3½ hours. The chilled reaction mixture was treated with an excess of acetic acid. The dye which separated was collected on a filter and washed with ethyl alcohol and water. The dye was purified by dissolving in a mixture of methyl alcohol and triethylamine (1 mol.) and re-precipitated by acidifying the solution with acetic acid. This re-precipitation was repeated. The dye was obtained as dull red crystals having a green reflex and melted at 272 to 237° C. with decomposition.

*Example 16.—3-carboxymethyl-5[(3-ethyl-2(3)-benzothiazolylidene)- isopropylidene] - 2-thio-2,4(3,5)-oxazoledione*

2.35 g. (1 mol.) of 2-thioacetylmethylene-3-ethyl-benzothiazoline and 1.86 g. (1 mol.) of methyl-p-toluenesulfonate were heated together on a steam bath for one hour. The fused mass was dissolved in 25 cc. of absolute ethyl alcohol and 1.75 g. (1 mol.) of 3-carboxymethyl-2-thio-2,4(3,5)-oxazoledione and 2.02 g. (2 mol.) of triethylamine were added and the whole refluxed for 30 minutes. The dye separated on chilling and acidifying. It was purified by dissolving in a mixture of ethyl alcohol and triethylamine and reprecipitating by the addition of acetic acid. It was obtained as reddish needles M. P. 158° to 160° C. dec.

*Example 17.—3-carboxymethyl-5-[(3 - ethyl - 2-(3)-benzoxazolylidene) -2-butenylidene]rhodanine*

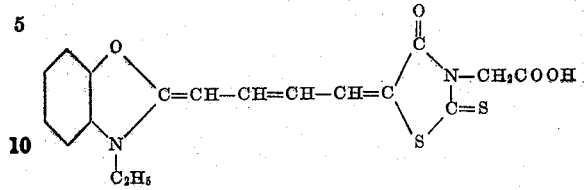

2.3 g. (1 mol.) of 2-(4-acetanilido-1,3-butadienyl)-benzoxazole ethiodide, .95 g. (1 mol.) of 3-carboxymethylrhodanine, 25 cc. of absolute ethyl alcohol and 1 g. (2 mol.) of triethylamine were refluxed together for 15 minutes. After chilling and acidifying with acetic acid, the dye separated from the reaction mixture on chilling. It was purified by dissolving in a mixture of alcohol and excess triethylamine, filtering and reprecipitating the dye by acidification with acetic acid. The dye was obtained as bluish crystals, M. P. 223° to 225° C. dec.

*Example 18.—5-[(3-ethyl - 2(3) - benzothiazolylidene)-2-butenylidene]-3- -sulfoethyl rhodanine*

2.4 g. (1 mol.) of 2-(4-acetanilido-1,3-butadienyl)-benzothiazole ethiodide, 1.2 g. (1 mol.) of 3-β-sulfoethyl-rhodanine, 30 cc. of absolute ethyl alcohol and 1 g. (2 mol.) of triethylamine were refluxed together for 15 minutes. The dye which separated was collected on a filter, washed with water, cold methyl alcohol and dried. It was purified by two recrystallizations from methyl alcohol, M. P. 298° to 300° C. dec.

*Example 19.—2-(3-carboxymethyl-4-oxo-2-thiono-5-thiazolidylidene)-3-ethyl-5-[(3-ethyl-2-(3)-benzoxazolylidene)-ethylidene]-4-thiazolidone*

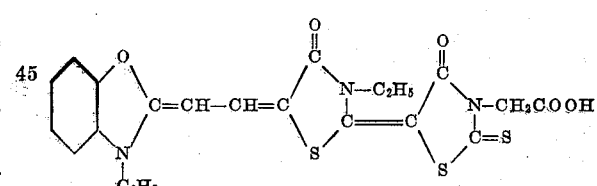

2.6 g. (1 mol.) of 5-[(3-ethyl-2(3)-benzoxazolylidene) - ethylidene] - 2-methylmercapto-4-thiazolone etho-p-toluenesulfonate, .95 g. (1 mol.) of 3-carboxymethylrhodanine, 50 cc. of absolute ethyl alcohol and 1 g. (2 mols.) of triethylamine were refluxed together for 20 minutes. The dye separated from the reaction mixture on acidification with acetic acid and chilling. The dye was purified by dissolving in ethyl alcohol plus triethylamine and reprecipitating by the addition of acetic acid. It was obtained as reddish crystals, M. P. above 300° C.

*Example 20.—3 - ethyl-5-[(3-ethyl-2(3)-benzoxazolylidene)ethylidene]-2-(4-oxo - 3 - β - sulfoethyl-2-thiono-5-thiazolidylidene) - 4-thiazolidone*

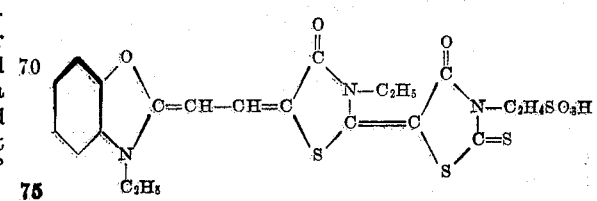

2.6 g. (1 mol.) of 5-[(3-ethyl-2(3)-benzoxazolylidene)-ethylidene]-2-methylmercapto - 4 - thiazolone etho-p-toluenesulfonate, 1.2 g. (1 mol.) of 3-β-sulfoethylrhodanine and 25 cc. of pyridine were refluxed for 5 minutes. The dye separated on chilling and was purified by recrystallization from 50 per cent ethyl alcohol. It was obtained as greenish crystals M. P. above 300° C.

In a manner similar to that illustrated in the foregoing examples, dyes containing 4-methylthiazole, 4-phenylthiazole, α-naphthothiazole, β-naphthothiazole, 4-methylselenazole, 4-phenylselenazole, α-naphthoselenazole, β-naphthoselenazole, 4-methyloxazole, 4-phenyloxazole, α-naphthoxazole, β-naphthoxazole, indolenine and pyridine (2- or 4-) nuclei can be prepared. Thus in Examples 1 and 2, 2-ethylmercaptobenzothiazole ethiodide can be replaced with a molecularly equivalent amount of 5-chloro-2-ethylmercaptobenzothiazole ethiodide, with a molecularly equivalent amount of 2-phenylmercaptobenzothiazole β-ethoxyethobromide, with a molecularly equivalent amount of 2-iodoquinoline ethiodide, with a molecularly equivalent amount of 4-phenylmercaptopyridine ethiodide, etc. In Examples 4, 8 and 9, the 2-β-acetanilidovinylbenzothiazole ethiodide can be replaced with molecularly equivalent amounts of 5-chloro-2-β-acetanilidovinylbenzothiazole ethiodide, 2 - β - acetanilidovinylbenzoxazole ethiodide, 2-β-acetanilidovinyl-5-phenylbenzoxazole ethiodide, etc. In Example 5, the 2-β-acetanilidovinyl quinoline ethiodide can be replaced by molecularly equivalent amounts of 2-β-acetanilidovinyl-4-phenylthiazole ethiodide, 2-β-acetanilidovinyl - 4 - phenylselenazole ethiodide, 2 - β - acetanilidovinyl - 4 - methylthiazole ethiodide, 2 - β - acetanilidovinyl-4-phenyloxazole ethiodide, 2-β-acetanilidovinyl-β-naphthothiazole etho-p-toluenesulfonate, 2-β-acetanilidovinyl-α - naphthothiazole etho-p-toluenesulfonate, etc. In Examples 7 and 11, the 2-β-acetanilidovinylbenzoxazole ethiodide can be replaced with molecularly equivalent amounts of 2-β-propionanilidovinylbenzothiazole ethiodide, 2-β - acetanilidovinylquinoline benzobromide, 2 - β-acetanilidovinylbenzothiazole. β - hydroxyethobromide, 2 - β - acetanilidovinylbenzothiazole pheniodide, 2 - β - acetanilidovinyl-3,3-dimethylindolenine methiodide, etc. In Example 17, the 2 - (4-acetanilido - 1,3 - butadienyl)benzoxazole ethiodide can be replaced with molecularly equivalent amounts of 2-(4-acetanilido-1,3-butadienyl)benzothiazole ethiodide, 2-(4-acetanilido-1,3-butadienyl)benzoselenazole ethiodide, 2-(4-acetanilido-1,3-butadienyl)-4 - phenylthiazole ethiodide, 4-(4-acetanilido - 1,3 - butadienyl)quinoline ethiodide, etc. In Examples 14, 15 and 16, the 2 - (2 - methylmercaptopropenyl)benzothiazole etho-p-toluenesulfonate (prepared from 3-ethyl-2-thioacetylmethylenebenzothiazoline and methyl p-toluenesulfonate) can be replaced by molecularly equivalent amounts of 2-(2-methyl-mercaptopropenyl)benzoselenazole metho-p-toluenesulfonate, 2 - (2 - methylmercaptopropenyl) - β-naphthothiazole etho - p - toluenesulfonate, 2-(2-methylmercapto - 2 - cyclopropylvinyl)benzothiazole etho-p-toluenesulfonate (see our copending application Serial No. 515,978, filed December 28, 1943, now Patent Number 2,441,529, May 11, 1948, wherein thioketones, such as 2-cyclopropylthioformylmethylene - 3 - ethylbenzothiazoline, are prepared by condensing 2-methylbenzothiazole etho-p-toluenesulfonate with cyclopropane carboxylic acid chloride, in the presence of pyridine in the cold, followed by treatment of the resulting ketone with phosphorus oxychloride, followed by treatment of the resulting β-chlorovinyl compound with thioacetamide, and treating the resulting thioketone on a steam bath for 30 minutes with methyl - p - toluenesulfonate), 2 - (2-methylmercaptopropenyl) - quinoline ethiodide (see the copending application of Grafton H. Keyes, Serial No. 478,007, now abandoned, filed March 4, 1943, wherein thioketones, such as 1-ethyl-2-thioacetylmethylene - 1, 2-dihydroquinoline, are prepared by condensing quinaldine etho-p-toluenesulfonate with methyl dithioacetate, in the presence of triethylamine, and the thioketone is heated with an alkyl salt, such as methyl-p-toluenesulfonate), etc. In Examples 19 and 20, the 5-[(3-ethyl-2(3)-benzoxazolylidene)ethylidene]-2-methylmercapto - 4 - thiazolone etho-p-toluenesulfonate can be replaced by molecularly equivalent amounts of quaternary salts formed by the addition of methyl-p-toluenesulfonate to any of the following merocyanine dyes in the manner described in British Patent 489,335, accepted July 22, 1938: 3-ethyl-5-(3-ethyl-2(3) - benzoxazolylidene)rhodanine, 3 - ethyl-5-(1-ethyl-2(1)-quinolylidene)rhodanine, 3-ethyl - 5 - (3-ethyl-2(3)-benzothiazolylidene)rhodanine, 5 - (3-ethyl-2(3)-benzothiazolylidene)-1,3-diphenyl - 2 - thiohydantoin, 3-ethyl-5-(1-ethyl-2(1) - β - naphthoxazolylidene)rhodanine, 5-[(3-ethyl - 2(3) - benzoxazolylidene)ethylidene] - 3-phenylrhodanine, 5-[(3-ethyl-2(3)-benzoxazolylidene)ethylidene]- 1,3-diphenyl-2-thiohydantoin, 5-[3-β-carbethoxyethyl - 2(3) - benzothiazolylidene)ethylidene] - 3 - carbethoxymethylrhodanine, 5-[(3-ethyl-2(3)-benzothiazolylidene)ethylidene]-3-methylrhodanine, 3 - ethyl-5-[(1-ethyl-2(1) - β - naphthothiazolylidene)ethylidene]rhodanine, 5 - [(5-chloro-3-ethyl-2(3) -benzothiazolylidene)isopropylidene]-3-ethylrhodanine, 5-(3-ethyl-2(3)-benzothiazolylidene) - 3 - ethyl-2-(3 - ethyl-4-oxo-2-thiono-5-thiazolidylidene)-4-thiazolidone, 5-[(3-ethyl -2 - (3)-benzoxazolylidene)ethylidene] - 1,3 - diphenyl - 2 - (3-ethyl-2-thiono - 4 - oxo - 5 - thiazolidylidene-4-imidazolidone, 3 - ethyl-5-[(3-ethyl-2(3) -benzothiazolylidine)isopropylidene] - 2 - (3-ethyl-4-oxo-2-thiono - 5 - thiazolidylidene-4-oxazolidone, etc. See also the copending application of Leslie G. S. Brooker, Serial No. 316,002, filed January 27, 1940, now Patent Number 2,454,629, November 23, 1948.

3-carboxymethyl - 1 - phenyl-5-pyrazolone was condensed with 2-(β-acetanilidovinyl) - benzoxazole ethiodide, in accordance with the procedure given in Example 11 to obtain yellow 4-[(3-ethyl-2(3)-benzoxazolylidene) ethylidene]-3-carboxymethyl-1-phenyl-5-pyrazolone, and with 2-(β - acetanilidovinyl) - 3,3 - dimethylindolenine methiodide to obtain orange-yellow 4-[(1,3,3-trimethylindolylidene)ethylidene] -3-carboxymethyl-1-phenyl-5-pyrazolone.

The following examples illustrate the preparation of ketomethylene compounds containing sulfoalkyl or carboxyalkyl groups.

*Example 21.—3-sulfomethyl-2-thio-2,4(3,5) - oxazoledione*

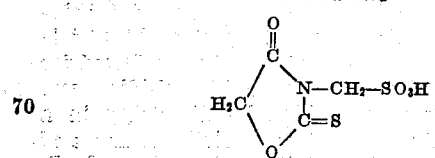

6.1 g. (2 mol.) of potassium hydroxide was dissolved in 30 cc. of water and the solution cooled to room temperature. 11.1 g. (2 mol.) of aminomethane sulfonic acid and 10.5 g. (1 mol.) of acetamidocarbothiolon glycolic acid

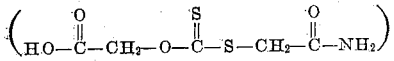

were added and the mixture stood over night at room temperature. It was then acidified with sulfuric acid, heated one hour on a steam bath and then chilled. The product separated and was collected on a filter and dried.

*Example 22.—3-carboxymethyl-2-thio-2,4(3,5)oxazoledione*

1.5 g. (1 mol.) of glycine was dissolved in a mixture of 28 cc. of 40 per cent sodium hydroxide and 56 cc. of water and the mixture cooled. To this was added 40.8 g. (1 mol.) of acetamidocarbothiolon glycolic acid and the mixture allowed to stand over-night. It was then heated on a steam bath for one hour. It was then acidified with sulfuric acid and heated a further two hours on a steam bath. The product separated as an oil which did not solidify on chilling.

*Example 23.—3-α-carboxyethylrhodanine*

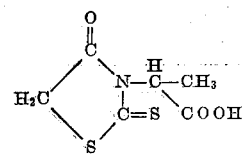

17.8 g. (1 mol.) of dl-alanine was dissolved in a mixture of 28 cc. of 40 per cent sodium hydroxide and 56 cc. of water. The solution cooled and 15.2 g. of carbon disulfide was added with stirring which was continued for 3 hours. To this was then added a solution of 18.9 g. of chloroacetic acid which had been neutralized with sodium carbonate. Stirring was continued another 3 hours. The mixture was then made acid to Congo red and stood over night. No product separated and so the mixture was heated on a steam bath for 1½ hours. The product separated as an oil which solidified on cooling. It was collected on a filter, washed with water and dried.

*Example 24.—3-β-carboxyethylrhodanine*

17.8 g. (1 mol.) of β-alanine was dissolved in a mixture of 28 cc. of 40 per cent sodium hydroxide and 56 cc. of water. The solution was chilled and 15.2 g. of carbon disulfide was added with stirring which was continued for four hours. To this was then added a solution of 18.9 g. of chloroacetic acid in water which had been neutralized with sodium carbonate. Stirring was continued for about three hours and the mixture then allowed to stand overnight. After acidification with dilute sulfuric acid, the mixture was heated two hours on a steam bath. The product separated as an oil which solidified on chilling. It was collected on a filter and dried.

*Example 25.—3-(1,3-dicarboxy-n-propyl)-rhodanine*

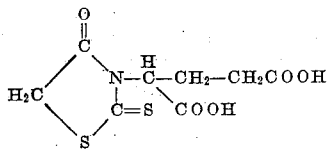

33.1 g. (1 mol.) of glutamic acid hydrochloride was dissolved in 112 cc. of 20 per cent aqueous sodium hydroxide and the solution chilled. 15.2 g. (1 mol.) of carbon disulfide was added with stirring which was continued for about four hours. To this was added an aqueous solution of 19.9 g. of chloroacetic acid which had been neutralized with sodium carbonate. Stirring was continued for three hours, and then the mixture was stood overnight. The mixture was acidified with dilute sulfuric acid, heated on a steam bath for two hours and then chilled. The product which separated was collected and dried.

*Example 26.—3-carboxymethylrhodanine*

45 g. (1 mol.) of glycine was dissolved in a mixture of 160 cc. of water and 84 cc. of 40 per cent aqueous sodium hydroxide solution. The whole was chilled in an ice water bath and 45.6 g. (1 mol.) of carbon disulfide was added slowly with stirring. This mixture was then stirred in the cold for about four hours. To this was added a solution made up of 56.4 g. (1 mol.) chloroacetic acid, 100 cc. of water and enough sodium carbonate to give a neutral solution. The whole was stirred for a further three hours and then allowed to stand overnight. The mixture was then acidified with dilute sulfuric acid and heated two hours on a steam bath. The product then separated on chilling and was filtered and dried. It was recrystallized from water.

*Example 27.—3-β-sulfoethylrhodanine*

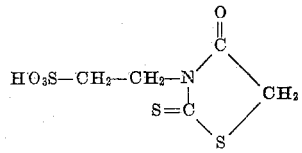

26 g. (2 mol.) of (85%) KOH dissolved in 100 cc. of water was placed in a 500 cc. 3-necked flask and chilled to 20° C. To this was then added 25 g. (1 mol.) of taurine and 15.2 g. (1 mol.) of carbon disulfide. The mixture was then stirred mechanically for two hours. 18.8 g. (1 mol.) of chloroacetic acid was dissolved in 100 cc. of water and neutralized with sodium carbonate. The neutral solution was added to the above reaction mixture and the whole stirred for another two-hour period and then allowed to stand at room temperature overnight. The reaction mixture was then made strongly acidic by addition of concentrated sulfuric acid. After standing 24 hours at about 0° C., the solid product which had separated was collected on a filter, washed with methyl alcohol and dried.

*Example 28.—1-carboxymethyl-3-phenyl-2-thiohydantoin*

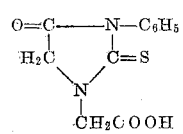

9.9 g. (1 mol.) of iminodiacetic acid diethyl ester (which has been described by Curtius and Hoffmann, J. Prakt. Chem. 96, 202 (1917) was mixed together with 7.1 g. (1 mol.) of phenylisothiocyanate. Heat was evolved. The mixture solidified on standing over night at room temperature. To insure complete reaction, the mixture was heated in an oil bath at 100–105° C. for two hours. The 1 - carbethoxymethyl - 3 - phenyl-2-thiohydantoin thus formed was purified by recrystallization from ethyl alcohol and was obtained as colorless needles M. P. 135–137° C. The yield was 11.8 g. 81% of theoretical. 2.8 g. of this material was hydrolyzed by treatment with 10% sodium hydroxide, warming just long enough to give complete solution. The cooled mixture was then acidified with hydrochloric acid chilled, collected on filter, washed with water and dried. The yield was 2.5 g., 100% of theory obtained as colorless crystals M. P. 192–195° C.

In the preparation of photographic silver halide emulsions containing the acid merocyanine dyes, it is only necessary to disperse the dyes in the emulsions. Ordinarily this is advantageously accomplished by forming a water-soluble salt of the acid merocyanine dye and dissolving the water-soluble salt in water, methanol or ethanol, or a mixture of water and methanol and ethanol, and dispersing the resulting solution in the emulsion. The salts are advantageously formed by adding to the acid merocyanine dye, wet with a little water, methanol or ethanol, an alkali metal hydroxide, e. g. sodium or potassium hydroxide, or ammonium hydroxide, or an amine, e. g. methylamine, ethylamine, dimethylamine, diethylamine, trimethylamine, triethylamine, ethanolamine, diethanolamine, triethanolamine, pyridine, N-methylpiperidine, n-propylamine, isopropylamine, butylamine, β-ethoxyethylamine, etc., and taking up the salt which forms in a suitable solvent, e. g. water, methanol, ethanol, a mixture of water and methanol, a mixture of water and ethanol, etc.

Sensitization by means of our new acid merocyanine dyes is primarily directed to the ordinarily employed gelatino-silver-halide developing-out emulsions, e. g. gelatino-silver-chloride, -chlorobromide, -chlorobromiodide, -bromide and -bromiodide developing-out emulsions. The acid dyes or their salts are advantageously added to the washed, finished emulsions and should, of course, be uniformly distributed throughout the emulsions.

The concentration of these compounds in the emulsion can vary widely, e. g. from about 5 to about 100 mg. per liter of flowable emulsion. The concentration of the dye will vary according to the type of light-sensitive material and according to the effects desired. The suitable and most economical concentration for any given emulsion will be apparent to those skilled in the art, upon making the ordinary tests and observations customarily used in the art of emulsion making. To prepare a gelatino-silver-halide emulsion sensitized with one of our new dyes, the following procedure is satisfactory: a quantity of the dye in salt form is dissolved in water, methyl alcohol, ethyl alcohol, a mixture of methyl alcohol and water or a mixture of ethyl alcohol and water, and a volume of the solution containing from 5 to 100 mg. of dye is slowly added to about 1000 cc. of a gelatino-silver-halide emulsion with stirring. Stirring is continued until the dye is uniformly dispersed. With the more powerful of our new sensitizing dyes, 10 to 50 mg. of dye per 1000 cc. of emulsion suffice to produce the maximum sensitizing effect with the ordinary gelatino-silver-halide emulsions. The above statements are only illustrative and are not to be understood as limiting our invention in any sense, as it will be apparent that our dyes can be incorporated by other methods in many of the photographic emulsions customarily employed in the art, such, for instance, as by bathing a plate or film upon which an emulsion is coated, in a solution of the dye (or its salt form) in an appropriate solvent, although such a method is ordinarily not to be preferred. The emulsion claims are intended to cover any combination of these new dyes with a photographic silver halide emulsion whereby the dyes exert a sensitizing effect on the emulsion.

The following table shows the sensitivity conferred on photographic gelatino-silver-halide emulsions by the dyes of the preceding examples:

| Example | Emulsion (medium speed) | Conferred Sensitivity, mu. | |
|---|---|---|---|
| | | Maximum | Extent |
| 1 | chlorobromiodide | 470 | 510 |
| 3 | bromiodide | 550 | 580 |
| 4 | ---do--- | 540 and 590 | 620 |
| 5 | ---do--- | 540 and 610 | 650 |
| 6 | chlorobromiodide | 500 | 530 |
| 7 | bromiodide | 550 | 590 |
| 8 | ---do--- | 550 to 600 | 630 |
| 9 | ---do--- | 540 | 640 |
| 10 | ---do--- | 560 | 610 |
| 11 | ---do--- | 560 | 610 |
| 12 | chlorobromiodide | 520 | 560 |
| 13 | ---do--- | 540 | 570 |
| 14 | bromiodide | 560 | 610 |
| 15 | ---do--- | 520 to 600 | 640 |
| 16 | ---do--- | 550 | 600 |
| 17 | ---do--- | 650 | 680 |
| 18 | ---do--- | 690 | 730 |
| 19 | ---do--- | 620 | 660 |
| 2 | chlorobromide | 470 | 520 |
| 20 | bromiodide | 600 | 680 |
| 15a | chlorobromide | 530 | 570 |
| 13a | bromiodide | 520 | 570 |
| 15b | ---do--- | 540 | 580 |

In the processes for preparing dyes described above, the heterocyclic compound containing the ketomethylene group and containing 5 atoms in the heterocyclic ring and containing a sulfoalkyl and/or a carboxyalkyl group can be employed in its metal or ammonium salt form. Actually in the foregoing examples where the condensations are carried out in the presence of a basic condensing agent, the basic condensing agent is partially used up in forming the metal or ammonium salt of the heterocyclic compound containing the ketomethylene group. For this reason one molecular proportion of the basic condensing agent for each molecular proportion of ketomethylene compound plus one molecular proportion of basic condensing agent for each carboxyalkyl group or sulfoalkyl group present, is employed.

The herein-described dyes are also useful in the preparation of optical filters useful for photographic purposes.

What we claim as our invention and desire to be secured by Letters Patent of the United States is:

1. The merocyanine dyes represented by the following general formula:

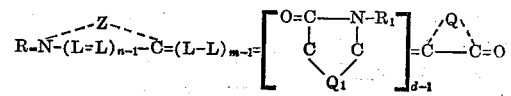

wherein R and $R_1$ each represents a member selected from the group consisting of an alcohol radical and an aryl group, L represents a methine group, $n$ represents a positive integer of from 1 to 2, $m$ represents a positive integer of from 1 to 3, $d$ represents a positive integer of from 1 to 3, Q represents the non-metallic atoms necessary to complete a heterocyclic nucleus containing a group selected from the group consisting of sulfoalkyl and carboxyalkyl groups and the metal and ammonium salt form of these groups, and containing 5 atoms in the heterocyclic ring, $Q_1$ represents a member selected from the group consisting of an oxygen atom, a sulfur atom, and a group of the formula $$-N-R_4$$

wherein $R_3$ represents a member selected from the group consisting of an alcohol radical and an aryl group, and Z represents the non-metallic atoms necessary to complete a heterocyclic nucleus containing from 5 to 6 atoms in the heterocyclic ring.

2. The merocyanine dyes represented by the following general formula:

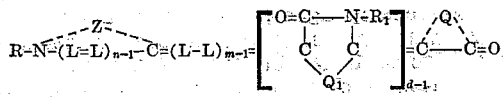

wherein R and $R_1$ each represents a member selected from the group consisting of an alcohol radical and an aryl group, L represents a methine group, $n$ represents a positive integer of from 1 to 2, $m$ represents a positive integer of from 1 to 3, $d$ represents a positive integer of from 1 to 3, Q represents the non-metallic atoms necessary to complete a rhodanine nucleus containing in the 3-position a member selected from the group consisting of sulfoalkyl groups containing from 1 to 3 carbon atoms and carboxyalkyl groups containing from 1 to 3 carbon atoms in addition to carboxyl group carbon atoms, $Q_1$ represents a member selected from the group consisting of an oxygen atom, a sulfur atom, and a group of the formula —N—$R_3$ wherein $R_3$ represents a member selected from the group consisting of an alcohol radical and an aryl group, and Z represents the non-metallic atoms necessary to complete a heterocyclic nucleus containing from 5 to 6 atoms in the heterocyclic ring.

3. The merocyanine dyes represented by the following general formula:

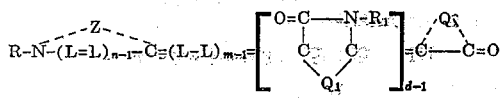

wherein R and $R_1$ each represents a member selected from the group consisting of an alcohol radical and an aryl group, L represents a methine group, $n$ represents a positive integer of from 1 to 2, $m$ represents a positive integer of from 1 to 3, $d$ represents a positive integer of from 1 to 3, Q represents the non-metallic atoms necessary to complete a 2-thio-2,4(3,5)-oxazoledione nucleus containing in the 3-position a member selected from the group consisting of sulfoalkyl groups containing from 1 to 3 carbon atoms and carboxyalkyl groups containing from 1 to 3 carbon atoms in addition to carboxyl group carbon atoms, $Q_1$ represents a member selected from the group consisting of an oxygen atom, a sulfur atom, and a group of the formula —N—$R_3$ wherein $R_3$ represents a member selected from the group consisting of an alcohol radical and an aryl group, and Z represents the non-metallic atoms necessary to complete a heterocyclic nucleus containing from 5 to 6 atoms in the heterocyclic ring.

4. The merocarbocyanine dyes represented by the following general formula:

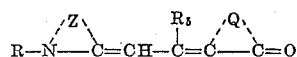

wherein R represents an alkyl group of the formula $C_nH_{2n+1}$ wherein $n$ represents a positive integer of from 1 to 4, $R_5$ represents a member selected from the group consisting of a hydrogen atom and an alkyl group of the formula $C_nH_{2n+1}$ wherein $n$ represents a positive integer of from 1 to 2, Z represents the non-metallic atoms necessary to complete a heterocyclic nucleus selected from those consisting of those of the oxazole series, those of the thiazole series, and those of the selenazole series, and Q represents the non-metallic atoms necessary to complete a rhodanine nucleus containing in the 3-position a member selected from the group consisting of sulfoalkyl groups containing from 1 to 3 carbon atoms and carboxyalkyl groups containing from 1 to 3 carbon atoms in addition to carboxyl group carbon atoms.

5. The merocarbocyanine dyes represented by the following general formula:

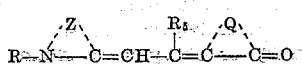

wherein R represents an alkyl group of the formula $C_nH_{2n+1}$ wherein $n$ represents a positive integer of from 1 to 4, $R_5$ represents a member selected from the group consisting of a hydrogen atom and an alkyl group of the formula $C_nH_{2n+1}$ wherein $n$ represents a positive integer of from 1 to 2, Z represents the non-metallic atoms necessary to complete a heterocyclic nucleus selected from those consisting of those of the oxazole series, those of the thiazole series and those of the selenazole series, and Q represents the non-metallic atoms necessary to complete a 2-thio-2,4(3,5)-oxazoledione nucleus containing in the 3-position a member selected from the group consisting of sulfoalkyl groups containing from 1 to 3 carbon atoms and carboxyalkyl groups containing from 1 to 3 carbon atoms in addition to carboxyl group carbon atoms.

6. The merocarbocyanine dyes represented by the following general formula:

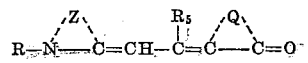

wherein R represents an alkyl group of the formula $C_nH_{2n+1}$ wherein $n$ represents a positive integer of from 1 to 4, $R_5$ represents a member selected from the group consisting of a hydrogen atom and an alkyl group of the formula $C_nH_{2n+1}$ wherein $n$ represents a positive integer of from 1 to 2, Z represents the non-metallic atoms necessary to complete a heterocyclic nucleus of the benzothiazole series, and Q represents the non-metallic atoms necessary to complete a 2-thio-2,4(3,5)-oxazoledione nucleus containing in the 3-position a member selected from the group consisting of sulfoalkyl groups containing from 1 to 3 carbon atoms and carboxyalkyl groups containing from 1 to 3 carbon atoms in addition to carboxyl group carbon atoms.

7. The merocarbocyanine dyes represented by the following general formula:

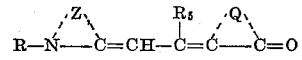

wherein R represents an alkyl group of the formula $C_nH_{2n+1}$ wherein $n$ represents a positive integer of from 1 to 4, $R_5$ represents a member selected from the group consisting of a hydrogen atom and an alkyl group of the formula $C_nH_{2n+1}$ wherein $n$ represents a positive integer of from 1 to 2, Z represents the non-metallic atoms necessary to complete a heterocyclic nucleus of the benzoxazole series, and Q represents the non-metallic atoms necessary to complete a rhodanine nucleus containing in the 3-position a member selected from the group consisting of sulfoalkyl groups containing from 1 to 3 carbon atoms and carboxyalkyl groups containing from 1 to 3 carbon atoms in addition to carboxyl group carbon atoms.

8. The merocarbocyanine dyes represented by the following general formula:

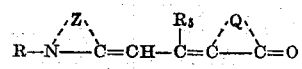

wherein R represents an alkyl group of the formula $C_nH_{2n+1}$ wherein $n$ represents a positive integer of from 1 to 4, $R_5$ represents a member selected from the group consisting of a hydrogen atom and an alkyl group of the formula $C_nH_{2n+1}$ wherein $n$ represents a positive integer of from 1 to 2, Z represents the non-metallic atoms necessary to complete a heterocyclic nucleus of the benzothiazole series, and Q represents the non-metallic atoms necessary to complete a rhodanine nucleus containing in the 3-position a member selected from the group consisting of sulfoalkyl groups containing from 1 to 3 carbon atoms and carboxyalkyl groups containing from 1 to 3 carbon atoms in addition to carboxyl group carbon atoms.

9. The merocarbocyanine dye represented by the following formula:

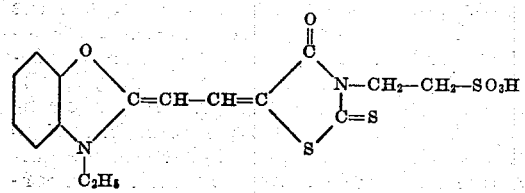

10. The merocarbocyanine dye represented by the following formula:

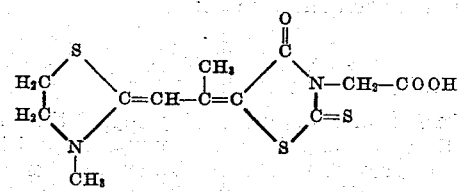

11. A process for preparing a merocyanine dye comprising condensing a cyclammonium quaternary salt containing in a reactive position a group selected from the group consisting of a halogen atom, a thioether group, a β-arylaminovinyl group and a 4-arylamino-1,3-butadienyl group, with a heterocyclic compound containing a ketomethylene group in the heterocyclic ring, said ketomethylene compound containing 5 atoms in the heterocyclic ring and containing at least one group selected from the group consisting of a sulfoalkyl group and a carboxyalkyl group and the metal and ammonium salt forms of these groups.

12. A process for preparing a merocyanine dye comprising condensing, in the presence of a basic condensing agent, a cyclammonium quaternary salt containing in a reactive position a group selected from the group consisting of a halogen atom, a thioether group, a β-arylaminovinyl group and a β-arylamino-1,3-butadienyl group, with a heterocyclic compound containing a ketomethylene group in the heterocyclic ring, said ketomethylene compound containing 5 atoms in the heterocyclic ring and containing at least one group selected from the group consisting of a sulfoalkyl group and a carboxyalkyl group and the metal and ammonium salt forms of these groups.

13. The merocyanine dye represented by the following formula:

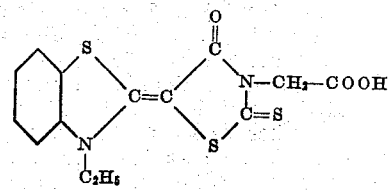

LESLIE G. S. BROOKER.
GRAFTON H. KEYES.

REFERENCES CITED

The following references are of record in the file of this patent:

UNITED STATES PATENTS

| Number | Name | Date |
|---|---|---|
| 2,078,233 | Brooker | Apr. 27, 1937 |
| 2,089,729 | Brooker | Aug. 10, 1937 |
| 2,108,485 | Hamer | Feb. 15, 1938 |
| 2,108,845 | Brooker | Feb. 22, 1938 |
| 2,170,807 | Brooker | Aug. 29, 1939 |
| 2,231,658 | Brooker | Feb. 11, 1941 |
| 2,263,018 | Sprague | Nov. 18, 1941 |
| 2,265,908 | Kendall | Dec. 9, 1941 |
| 2,274,782 | Gaspar | Mar. 3, 1942 |
| 2,338,782 | Reister | Jan. 11, 1944 |

Certificate of Correction

Patent No. 2,493,748    January 10, 1950

LESLIE G. S. BROOKER ET AL.

It is hereby certified that errors appear in the printed specification of the above numbered patent requiring correction as follows:

Column 5, line 51, for that portion of the formula reading "$CH_3$—COOH" read $C_2H_4$—$SO_3H$; line 70, for "$CH_4$—$SO_3H$" read $CH_2$—$COOH$; column 9, line 56, for "237° C." read $273°$ C.; column 10, line 26, for " -3- -sulfoethyl" read $-3$-$\beta$-sulfoethyl; and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*